United States Patent
Bushnell et al.

(10) Patent No.: US 10,498,159 B2
(45) Date of Patent: Dec. 3, 2019

(54) VARIABLE DIAMETER COIL FOR EFFICIENT INDUCTIVE CHARGING

(71) Applicant: Apple Inc., Cupertino, CA (US)

(72) Inventors: Tyler S. Bushnell, Mountain View, CA (US); Makiko K. Brzezinski, Santa Clara, CA (US); Christopher S. Graham, San Francisco, CA (US); Stephen E. Yao, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 633 days.

(21) Appl. No.: 15/156,225

(22) Filed: May 16, 2016

(65) Prior Publication Data
US 2017/0331316 A1   Nov. 16, 2017

(51) Int. Cl.
*H02J 7/00* (2006.01)
*H02J 7/02* (2016.01)
*H01F 38/14* (2006.01)
*H01F 27/28* (2006.01)

(52) U.S. Cl.
CPC .......... *H02J 7/025* (2013.01); *H01F 27/2823* (2013.01); *H01F 38/14* (2013.01)

(58) Field of Classification Search
CPC ...................................................... H02J 7/025
USPC .......................................................... 320/108
See application file for complete search history.

(56) References Cited

U.S. PATENT DOCUMENTS

| | | | |
|---|---|---|---|
| 2011/0095618 A1* | 4/2011 | Schatz | H03H 7/40 307/104 |
| 2014/0091758 A1* | 4/2014 | Hidaka | H01F 38/14 320/108 |
| 2015/0054457 A1* | 2/2015 | Kim | H01F 38/14 320/108 |
| 2015/0279548 A1* | 10/2015 | Ngo | H01F 3/10 336/200 |
| 2015/0348697 A1* | 12/2015 | Graham | H01F 27/2823 336/189 |
| 2015/0349571 A1* | 12/2015 | Wagman | H02J 50/90 320/108 |
| 2016/0064992 A1* | 3/2016 | Herbst | H02J 7/025 307/104 |

* cited by examiner

*Primary Examiner* — Yalkew Fantu
(74) *Attorney, Agent, or Firm* — Kilpatrick Townsend & Stockton LLP

(57) ABSTRACT

This application relates to inductive charging coil configurations. In particular, the wireless charging coil configurations are arranged in a shape and size suitable for utilizing available space within a device housing. In some embodiments, wires making up the charging coil have varying diameters configured to optimize the size and shape of the charging coil so that available space can be fully utilized.

19 Claims, 11 Drawing Sheets

*A-A*

*B-B*

D-D

D-D

D-D

E-E

VARIABLE DIAMETER COIL FOR EFFICIENT INDUCTIVE CHARGING

FIELD

The described embodiments relate generally to inductive charging. More particularly, the present embodiments are directed towards methods and apparatus for designing inductive charging coils capable of occupying most or all available space within device housings having irregular internal geometries.

BACKGROUND

Portable electronic devices often are enclosed within small form factor housings to make carrying and/or wearing the devices more convenient. Unfortunately, this makes the efficient utilization of space available within the housings of great importance. Some housings include various protrusions and/or recesses that make the device more comfortable to wear or enhance the overall function of a particular sensor. These irregularly shaped protrusions and recesses can result in empty space within the housings that goes unutilized.

SUMMARY

This disclosure describes various embodiments that relate to ways in which components can be efficiently arranged within a device housing to improve the performance of the device without increasing the size of the device housing.

A wireless charging coil is disclosed that can include first and second loops with the first loop arranged along a peripheral portion of the charging coil and the second loop arranged within a central portion of the charging coil. Alternatively, the position of the loops can be reversed to suit different devices. The first loop can be formed from one or more wires having a first wire diameter and the second loop can be formed from one or more wires having a second wire diameter greater than the first wire diameter.

A portable electronic device is disclosed that includes a device housing having a wall defining a concave recess within the device housing. The portable electronic device also includes a charging coil having a variable diameter electrically conductive conduit arranged in multiple loops, an average outer diameter of a first portion of the conduit arranged in a central portion of the concave recess being greater than an average outer diameter of a second portion of the conduit that is arranged in a peripheral portion of the concave recess. In some embodiments, other non-conventional recesses and protrusions within the device housing can be accommodated by varying the outer diameter of the conduit so that space around the protrusion or recess can be fully utilized.

Another charging coil is disclosed and includes an electrically conductive conduit having a first wire of a first length, and a second wire of a second length less than the first length. The second wire is electrically coupled with a portion of the first wire disposed in a central portion of the charging coil. The electrically conductive conduit is arranged in multiple loops. By using wires of varying length, all the wires can begin and end at the same point while the shorter whiles can bypass a peripheral portion of the coil and be included only in the more central portions of the charging coil.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
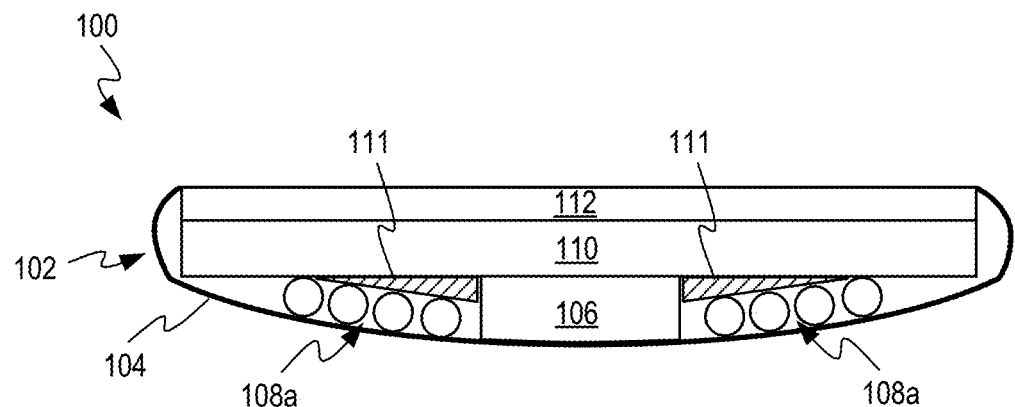
FIG. 1A shows a device having a device housing that includes a protruding wall designed to accommodate a sensor.

Other aspects and advantages of the invention will become apparent from the following detailed description taken in conjunction with the accompanying drawings which illustrate, by way of example, the principles of the described embodiments.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

A portable electronic device can take many different sizes and shapes. The integration of biometric sensors within the portable electronic device can influence the design. For example, a portion of a device housing can be shaped to protrude from the device housing so that a sensor positioned upon the device housing and in contact with a user can be pressed more firmly against the skin of the user. These protrusions often leave space within the device, which is difficult to efficiently fill with conventional components. Alternatively, various exterior features of a device can be shaped primarily for aesthetic purposes. For example, sidewalls of a device housing can be curved to make the device housing more comfortable in the hand. Again curved surfaces can create curved recesses that can be challenging to fully utilize.

One solution to this problem is to customize the shape and size of one or more internal device components to conform to the shape and size of any irregularities (e.g. recesses or protrusions) of the device housing. For example, a wireless charging coil can be modified so that instead of having a uniform thickness, a central portion of the coil has an increased thickness to take advantage of the additional space made available by a protruding portion of the device housing. Similarly, a device housing can have a recessed exterior surface defined by a housing wall that forms a convex protrusion extending into the interior of the device housing. In such a case, peripheral portions of the coil can be increased to take advantage of the peripheral areas of the device housing that have additional space for accommodating the expanded interior space within the device housing.

These and other embodiments are discussed below with reference to FIGS. 1A-7; however, those skilled in the art will readily appreciate that the detailed description given herein with respect to these figures is for explanatory purposes only and should not be construed as limiting.

FIG. 1A shows a device 100 having a device housing 102 that includes a protruding wall 104 designed to accommodate a sensor 106. In some embodiments, sensor 106 can include a magnetic element designed to facilitate the alignment of a wireless charger with an exterior surface of device 101O. Device 100 can take many forms including, e.g. a cellular phone, a media player, a wearable device, etc. Charging coil 108a is depicted being adhered to or proximate an interior facing surface of protruding wall 104. Charging coil 108a includes one or more coiled wires arranged in multiple loops and can be configured to receive electricity wirelessly through protruding wall 104. In some embodiments, each of the wires can be made from a copper alloy. For this reason, at least a portion of protruding wall 104 can be made of a magnetically permeable material such as, for example, glass or polymer based substrates. In this way, the energy transferring magnetic field emitted by the charging device can pass efficiently through protruding wall 104. Loops of charging coil 108 can take the form of an electrically conductive conduit formed of one or more wires and can have a substantially uniform outer diameter. The loops of charging coil 108 that are positioned closer to a central portion of protruding wall 104 are positioned increasingly farther from operational component 110, on account of operational component 110 having a substantially planar surface facing charging coil 108. Operational component 110 can take many forms, including for example an electronic assembly including one or more of an integrated circuit, a data storage medium and a battery. Because of the substantially planar lower surface of operational component 110, spaces 111 between the more central loops of charging coil 108 and operational component 110 go unused. A benefit of the rectangular shape of operational component 110 is that it provides a conforming support surface for display assembly 112, which also has a substantially rectangular geometry. It should be noted that while the loops of charging coil 108 are shown being separated by a gap, each of the loops forming charging coil 108 can also be arranged more closely together so that adjacent coils are pressed firmly together, thereby increasing the packing efficiency of the coils arranged within the device housing.

Figure 1B:
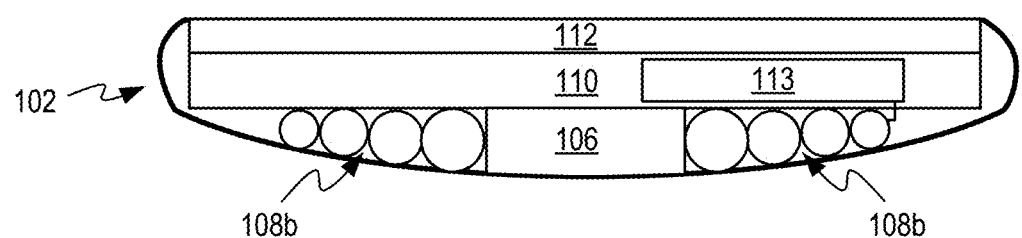
FIG. 1B shows how by gradually increasing the outer diameter of each loop of a charging coil the space between a protruding wall of the device housing and an operational component can be more efficiently utilized.

FIG. 1B shows how by gradually increasing the outer diameter of each loop of charging coil 108b the space between protruding wall 104 and operational component 110 can be more efficiently utilized. The gradually increasing outer diameter of charging coil 108b can reduce the impedance within charging coil 108b, thereby increasing the efficiency with which charging coil 108b can receive electrical energy. While a single row of coils is shown, it should also be appreciated that multiple rows of smaller coils can be stacked together to achieve similar configurations. Charging coils with increasing diameters also have the benefit of reducing space within which individuals loops of charging coil 108b can shift during use. In this way, charging coil 108b can receive a predictable amount of electricity from a charging device. Additionally, on account of charging coil 108b utilizing more of the space between protruding wall 104 and operational component 110, charging coil 108b can provide support to a bottom portion of operational component 110. In some embodiments, operational component 110 can compress charging coil 108b against an interior facing surface of device housing 102. FIG. 1B also depicts how battery assembly 113 can be integrated into operation al component 110 and electrically coupled with charging coil 108b.

Figure 1C:
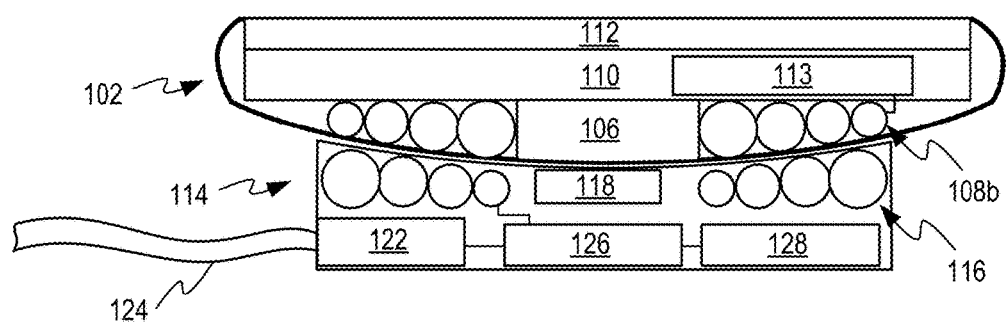
FIG. 1C shows how varying the diameter of wires making up a charging coil can also maximize wire density when the charging coil is configured to be positioned proximate a convex surface.

FIG. 1C shows how a charging device 114 can also include varying coil sizes arranged to conform with a convex surface and maximize wire density within charging device 114. Charging device 114 can also include one or more internal magnets 118 for aligning charging device 114 with electronic device 100. Internal magnets 118 can be configured to cooperate with magnetic elements of electronic device 100. In some embodiments, magnets can be arranged within or proximate sensor 106 to achieve a positive alignment between charging coil 116 and charging coil 108b. FIG. 1C also depicts how charging device 114 includes other supporting electrical components such as power source 122. Power source 122 can be configured to condition power entering charging device 114 through cable 124. For example, AC power received from a wall outlet could be converted to DC power in some applications. In some embodiments, power source 122 can be operative to adjust the voltage of the power being received. Power source 122 is configured to supply conditioned power to charging coil 116, processing unit 126 and storage medium 128. In some embodiments, cable 124 is configured to transmit both power and data to charging device 114. Processing unit 126 can then determine how to adjust operation of charging device 114 in accordance with any control signals received by way of cable 124. For example, power supplied to charging coil 116 could be modulated in accordance with instructions executed by processing unit 126. Storage medium 128 can be configured to store instructions for later execution. In some embodiments, the information stored in storage medium 128 can govern standard operations of charging device 114. In some embodiments, firmware updates could be applied to data stored in storage medium 128.

Figure 2A:
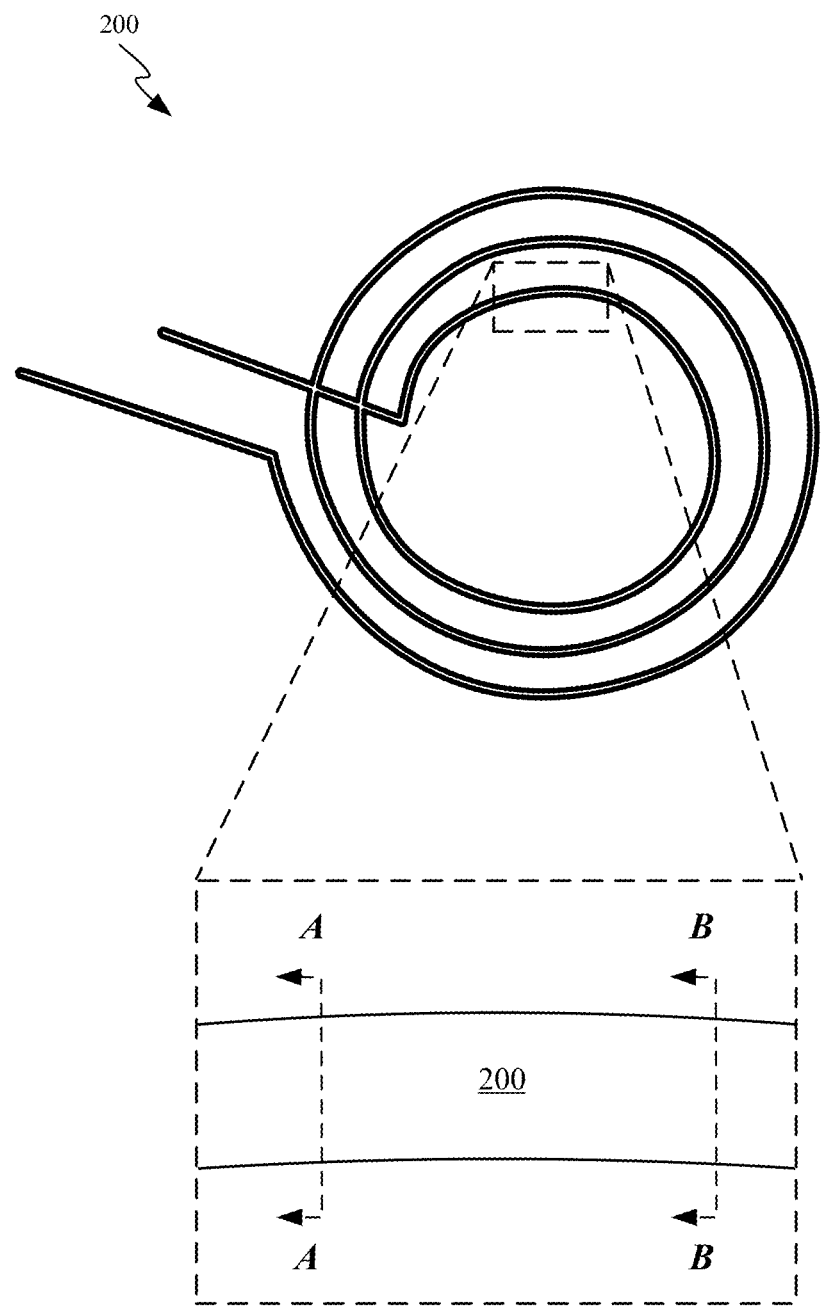
FIG. 2A shows a portion of a charging coil and depicts an offset between two section lines.
Figure 2B:
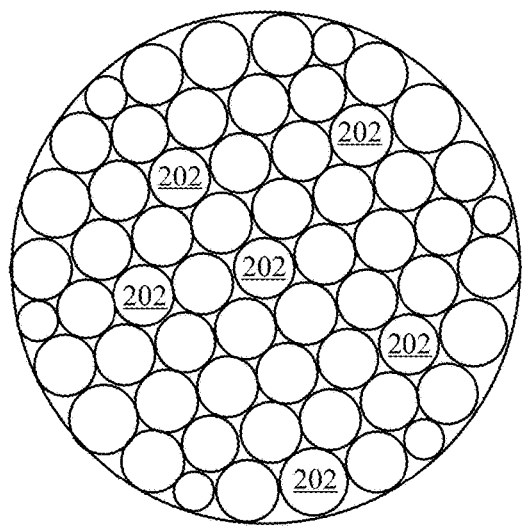
FIGS. 2B-2C show cross-sectional views of one section of the charging coil depicted in FIG. 2A and formed from multiple wires.
Figure 2C:
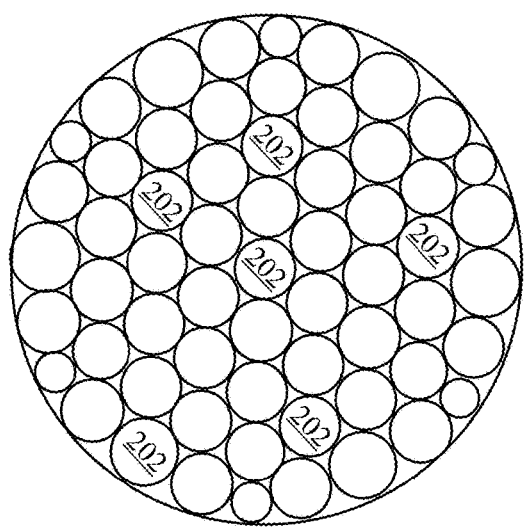

FIG. 2A shows a top view of a charging coil 200 made up of a bundle of wires and a close up view of a portion of charging coil 200. Section lines A-A and B-B are represented in the closeup view to indicate two different regions of the portion of charging coil 200. FIGS. 2B-2C show cross-sectional views of the portion of the charging coil depicted in FIG. 2A in accordance with section lines A-A and B-B respectively. FIGS. 2B and 2C show how wires 202 of charging coil 200 have substantially the same diameter. In some embodiments, wires 202 can be arranged in parallel while in other embodiments the wires can be twisted together. In some instances, the bundle of wires 202 cooperating to form this portion of the charging coil can be referred to as a conduit, which as depicted has an outer diameter 203. FIG. 2B shows how in the distance between section lines A-A and B-B wires 202 can rotate along a length of the section of coil when twisted about one another by an angle of about 45 degrees.

Figure 2D:
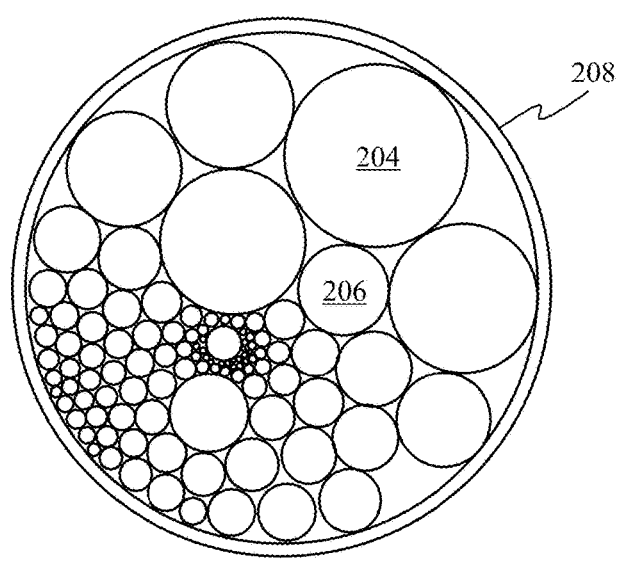
FIG. 2D shows how the diameter of each individual wire making up the coil can vary.

FIG. 2D shows how the diameter of each individual wire making up the coil can vary. For example, a diameter of wire 204 can be substantially larger than a diameter of wire 206. By varying the diameter of the individual wires, the current density can be biased towards a desired side of the wire. In addition to biasing current density the smaller diameter wires help to fill in the cross-section of the wire so there is less empty space within the wire cross-section. In some embodiments, the wires can be enclosed within insulating layer 208. Insulating layer 208 can prevent wires arranged along an exterior portion of the conduit from contacting adjacent wires associated with another portion of the conduit. In this way, shorting can be prevented.

Figure 3A:
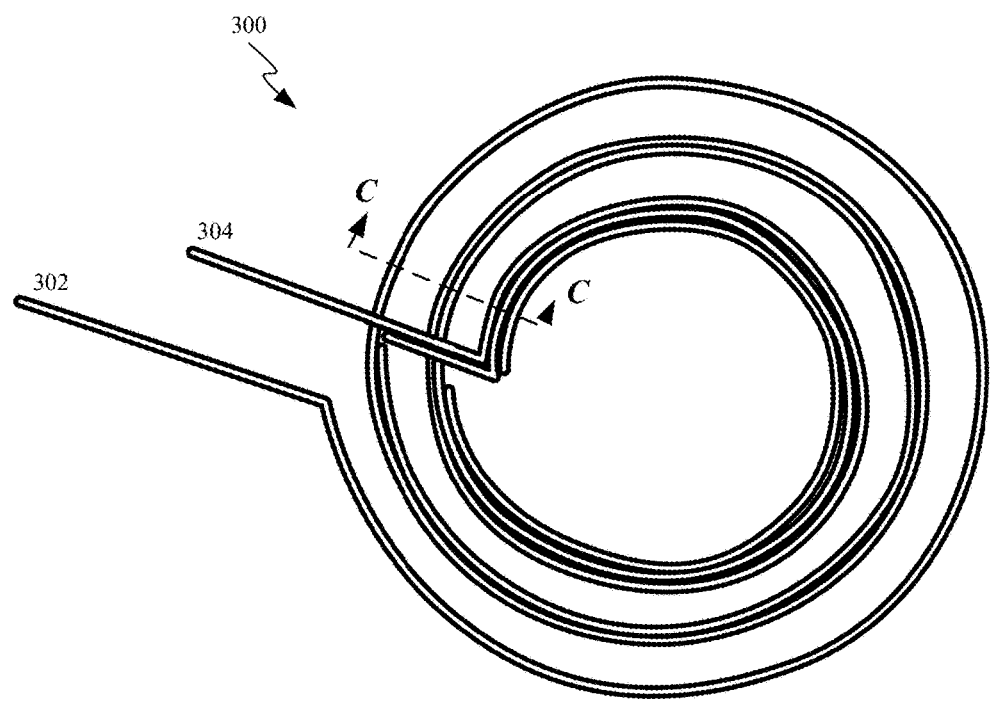
FIG. 3A shows a top view of an exemplary charging coil.

FIG. 3A shows a top view of exemplary charging coil 300. Charging coil 300 can include positive lead 302 and negative lead 304, which can be electrically coupled with a battery or similar energy storage device. Charging coil 300 shows one way in which central portions of the charging coil can be made thicker than other portions of the charging coil. In this depiction a central portion of the conduit includes as many as three wires, which increase the outer diameter of that portion of the charging coil. While the three wires are depicted as being parallel to one another this configuration is made for illustrative purposes only and it should be appreciated that the coils could be vertically stacked and/or twisted about one another to increase the number of coils that can be arranged within the constrained space. FIG. 3A also illustrates how the central portion of the coil is designed to include more wires by adding a shorter wire to only the central loops of charging coil 300. The ends of each of the shorter wires can be melted or soldered to longer wires so that electricity traveling on the shorter wires can easily transition between the shorter wires and the longer wires without adding a substantial amount of impedance to the charging coil.

Figure 3B:
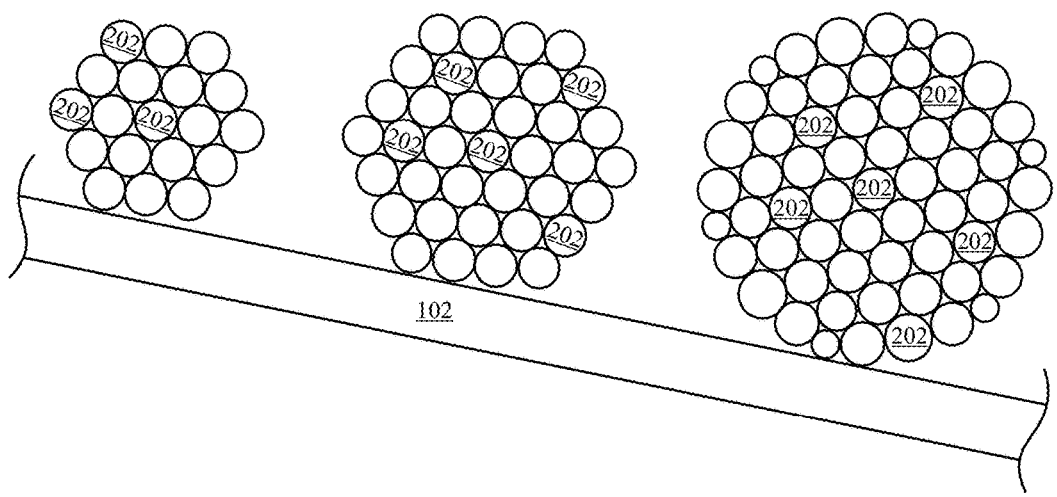
FIG. 3B shows a cross-sectional view of a portion of the exemplary charging coil in accordance with a section line.

FIG. 3B shows a cross-sectional view of a portion of charging coil 300 in accordance with section line C-C and how each of wires 202 can be stacked together in discrete loops spaced apart from adjacent loops and atop an interior-facing, sloped surface of housing 102. In particular, each of the single wires depicted in FIG. 3A represents multiple smaller wires. Instead of arranging the wires side-by-side as was implied by FIG. 3A, FIG. 3B shows how the wires are grouped together in increasingly taller loops groups, making a height of each discrete grouping of wires about the same height. Each loop is depicted containing an increasingly large number of wires. The beginning and end of each of the shorter wires can be welded and/or fused to adjacent wires so that electricity can flow out of the terminated wire and into the smaller set of wires.

Figure 4A:
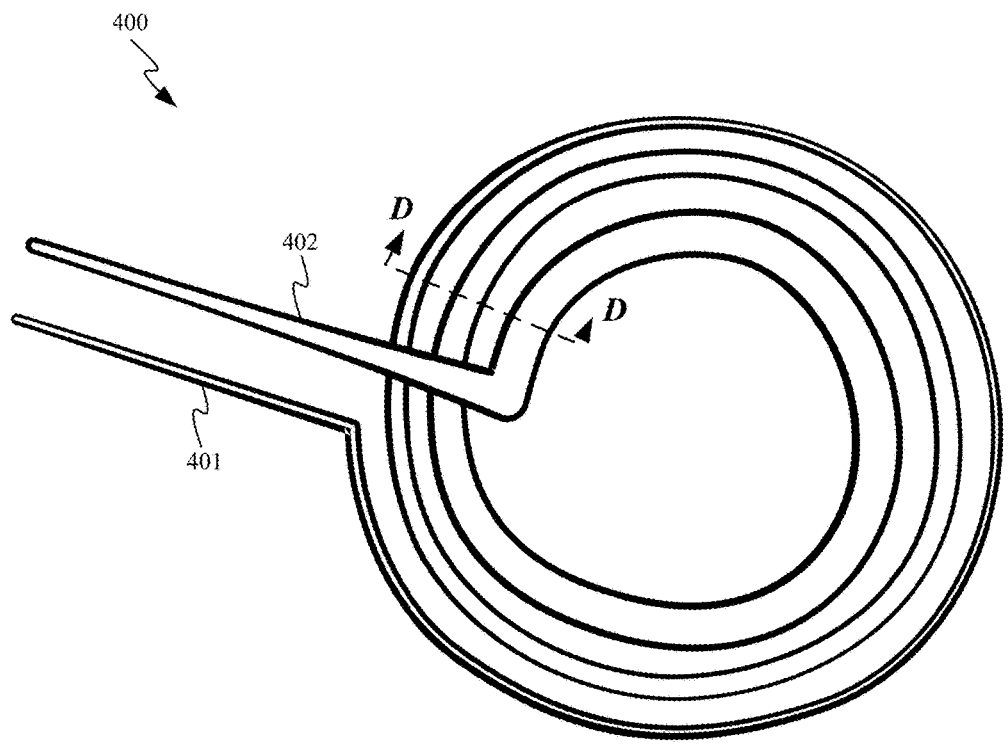
FIG. 4A shows a charging coil formed from a wire drawn in a way that causes it to have a varying diameter to match the desired height of the space available for the charging coil.

FIG. 4A shows a configuration of charging coil 400 in which a wire has a varying diameter to match the desired height of the space available for the charging coil. This can be accomplished by drawing different portions of the wire through differing diameter apertures or by changing a diameter of an aperture through which the wire is drawn. In this way, a single wire having a varying diameter can be used to maximize an amount of space available within an associated device housing. As depicted, charging coil 400 includes leads 401 and 402. In particular, lead 402 can be configured to pass over loops of charging coil 400. A diameter of either lead 402 and/or the loops it overlaps can be adjusted to accommodate lead 402.

Figure 4B:
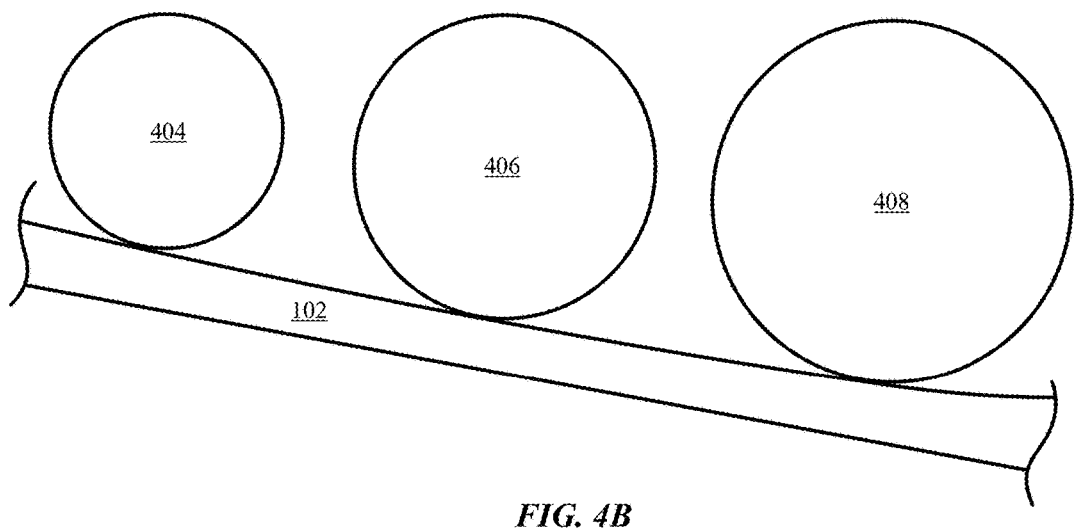
FIG. 4B shows a cross-sectional view of one side of each loop of the charging coil and how the diameter of the wire is different for adjacent loops.

FIG. 4B shows a cross-sectional view of one side of each loop of a charging coil 400 in accordance with section line D-D and how the diameter of the wire gradually increases over most of the length of the wire so that the wire diameter gets progressively larger between adjacent loops. While a gradually increasing wire diameter is depicted it should be appreciated that the wire diameter can both increase and decrease. For example, where an associated device housing has a protrusion coinciding with portion 404 of charging coil 400, then the diameter of portion 404 could be substantially greater than that of portions 404 and 408. Other variations include the diameter of the charging coil changing more abruptly. For example, each wire could be configured to reduce rapidly in diameter just prior to crossing beneath lead 402.

Figure 4C:
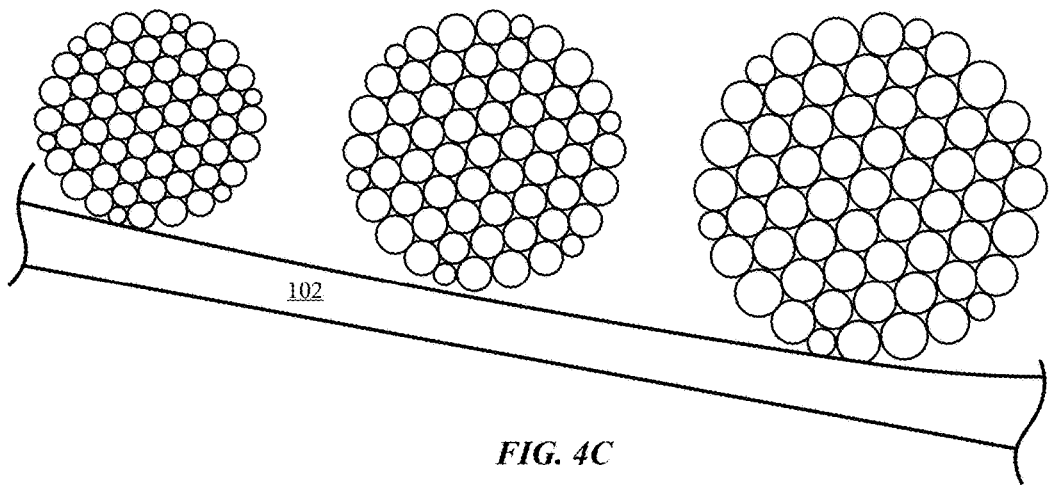
FIG. 4C depicts an alternative embodiment in which each loop is formed from multiple wires that gradually get larger and smaller together to more substantially increase and decrease the outer diameter of each loop
Figure 4D:
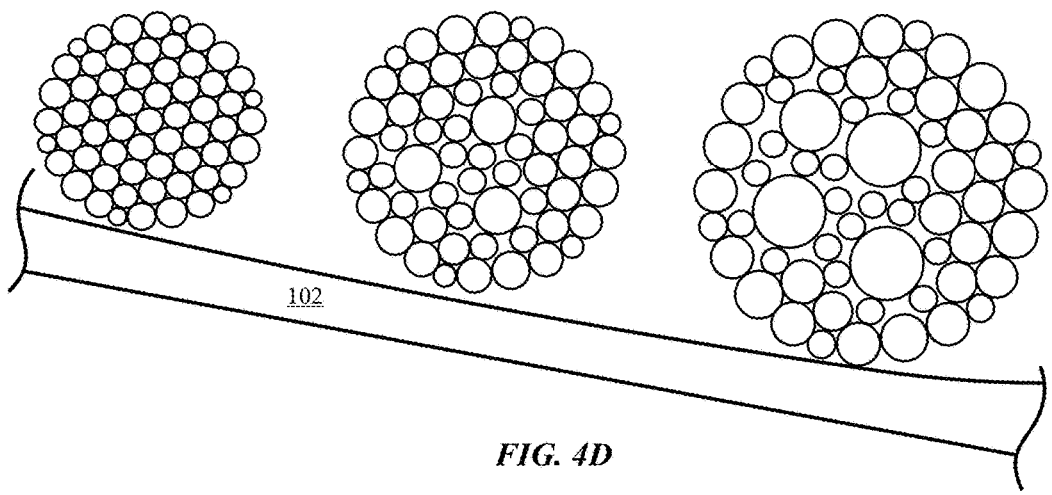
FIG. 4D shows a charging coil formed from a bundle of wires having varying diameters.

FIG. 4C depicts an alternative embodiment in which each loop is formed from multiple wires that gradually get larger and smaller at the same rate in order to increase or decrease the outer diameter of each loop. FIG. 4D shows an embodiment in which only select wires of a bundle of wires increase and decrease in diameter, while the rest of the wires stay the same size and/or increase and decrease in size at different rates.

Figure 4E:
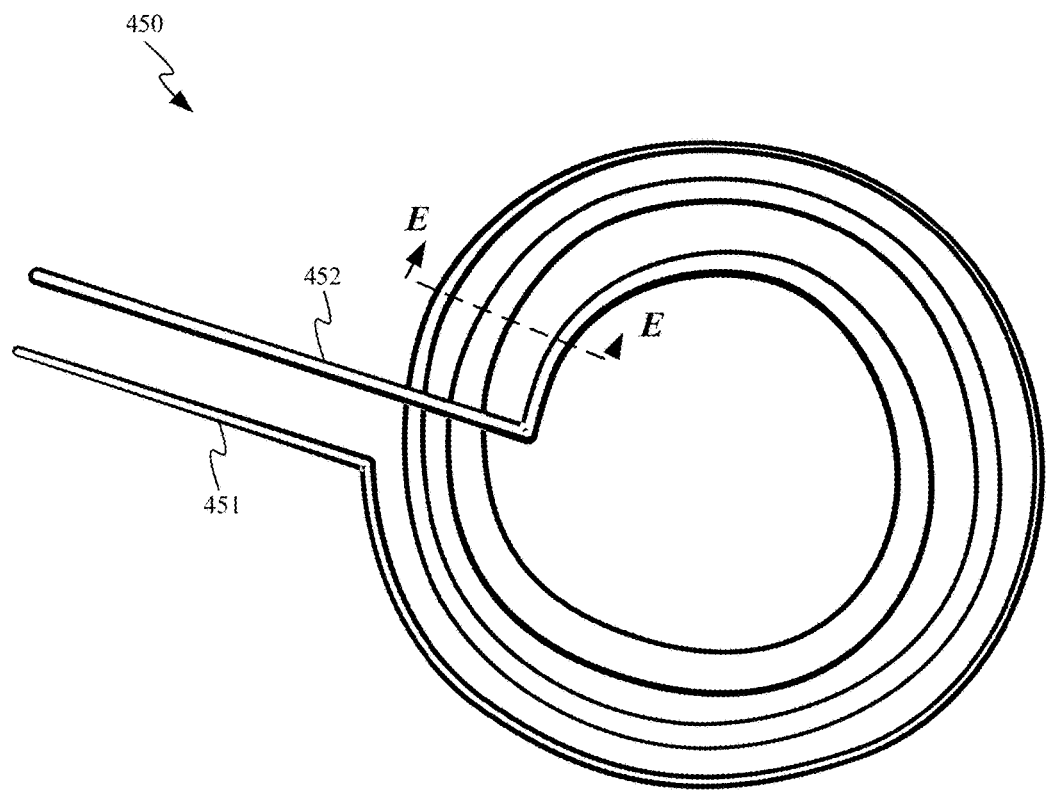
FIG. 4E shows another charging coil formed from a wire drawn in a way that causes it to have a varying diameter.

FIG. 4E shows another configuration of charging coil 450 in which a wire has a varying diameter to match the desired height of the space available for the charging coil. This can be accomplished by drawing different portions of the wire through differing diameter apertures or by changing a diameter of an aperture through which the wire is drawn. Charging coil 450 is drawn so that one portion of the coil gets larger and then gets smaller again. As depicted, charging coil 400 includes leads 451 and 452. In particular, lead 452 can be configured to pass over loops of charging coil 400. A diameter of either lead 452 and/or the loops it overlaps can be adjusted to accommodate lead 452.

Figure 4F:
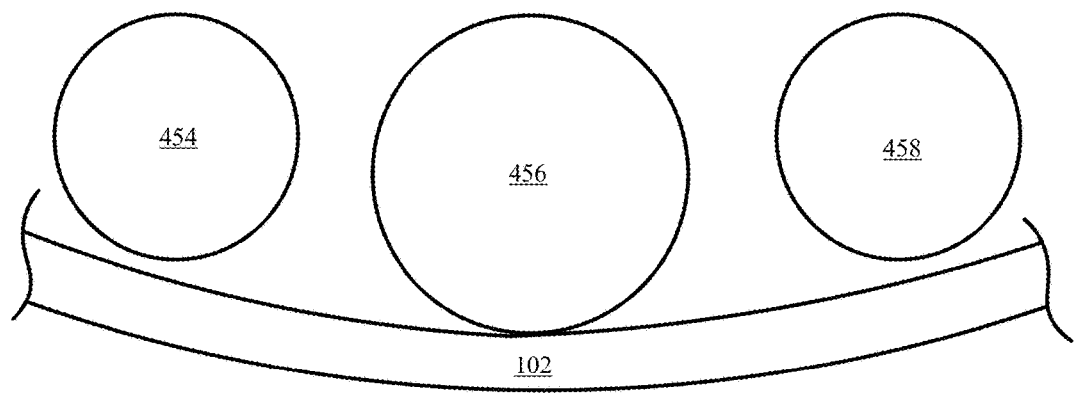
FIG. 4F shows a cross-sectional view of one side of each loop of the charging coil depicted in FIG. 4E.

FIG. 4F shows a cross-sectional view of one side of each loop of charging coil 450 in accordance with section line E-E and how the diameter of the wire gradually increases and then decreases again so that portion 456 is larger than either of adjacent loops represented by portions 454 and 458.

This configuration can be helpful where an associated device housing has a protrusion coinciding with portion 406 of charging coil 450.

Figure 5:
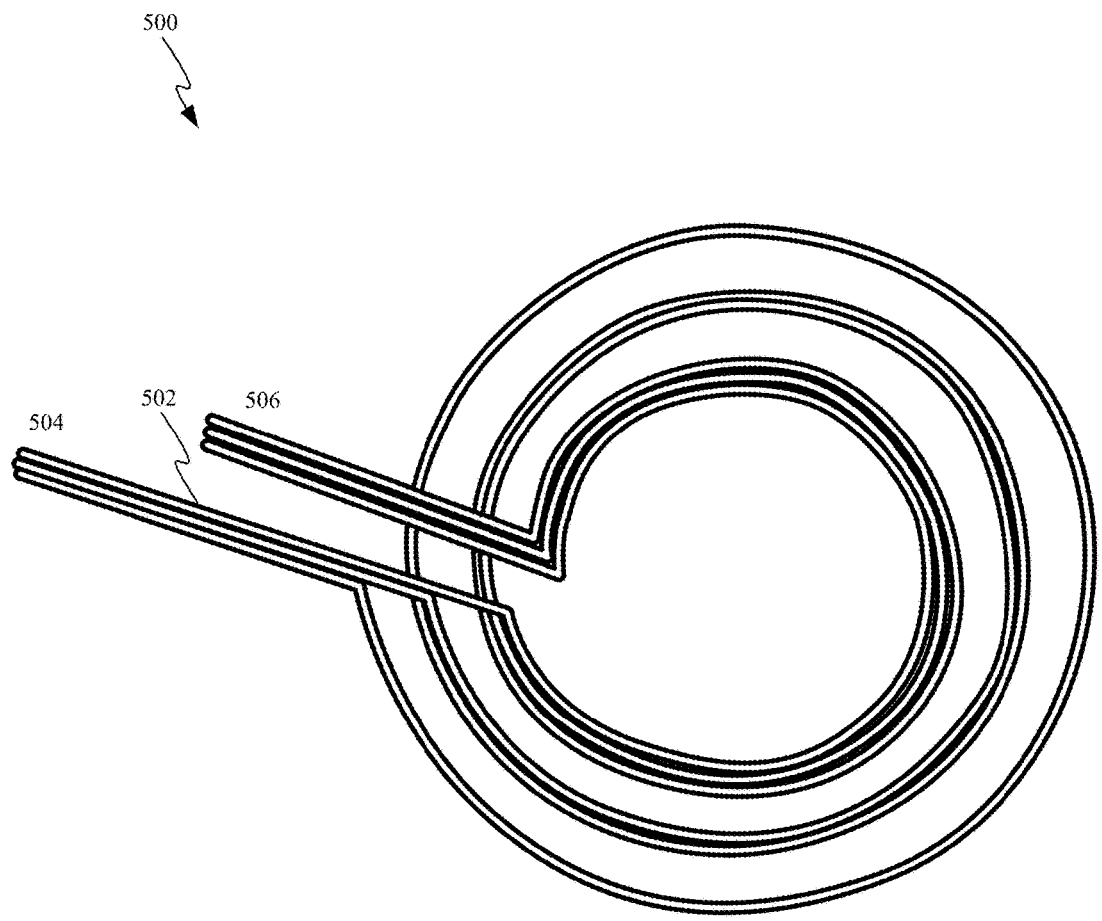
FIG. 5 shows a top view of a charging coil in which different length wires can be joined together and overlap one another so that a central portion of the charging coil is substantially thicker than a peripheral portion of the charging coil.

FIG. 5 shows a top view of a charging coil in which different length wires can be joined together and overlap one another so that a central portion of the charging coil is substantially thicker than a peripheral portion of the charging coil. This accomplished by only joining the shorter lengths of wire to the central portion of charging coil 500 by bypassing the outer loops of the charging coil, when the outer loops occupy portions of an associated device housing with minimal space for the charging coil. For example, wire 502 bypasses the first and second loops and is only joined to the inner-most loop of charging coil 500. In this way, this wire can be coupled with both positive terminal 504 and negative terminal 506 without unduly thickening peripheral portions of charging coil 500. It should be noted that in some embodiments, terminals 504 and 506 can be dipped in tin so that wires at each end can be kept from fraying or separating and so that each end can be more easily coupled to a single electrical terminal.

Figure 6A:
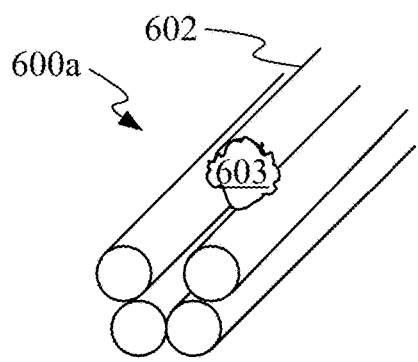
FIGS. 6A-6D show perspective views of various wire configurations.
Figure 6B:
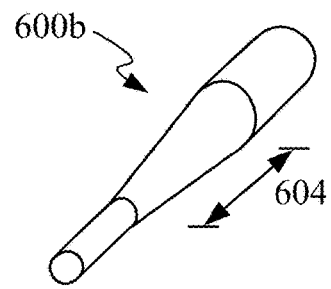
Figure 6C:
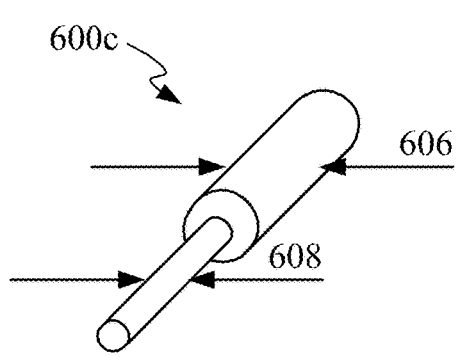
Figure 6D:
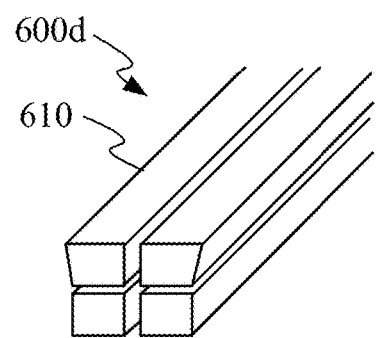

FIGS. 6A-6D show perspective views of additional wire configurations. FIG. 6A shows a group 600a of five constant diameter wires. Wire 602 is substantially shorter than the other wires in the group and terminates before the other wires. As shown in FIG. 6A, solder 603 electrically couples the end of wire 602 to one or more of the other wires in group 600a adjacent to wire 602. In some embodiments, solder 603 can be a tin solder. In this way, by removing one wire the overall diameter of the remaining wires can be reduced. FIG. 6B shows a variable diameter wire 600b having a variable diameter that changes gradually over a fixed distance 604. In some embodiments, the rate of change of the diameter can be constant until a desired diameter is achieved, while in other embodiments the rate of change of the diameter can gradually increase or decrease. FIG. 6C shows a variable diameter wire 600c, which transitions abruptly from diameter 606 to diameter 608. It should be understood that while the wires are only depicted changing diameter once that the diameter can also change multiple times. Furthermore, variable diameter wires can be grouped together, changing at the same rate or different rates than adjacent wires. FIG. 6D shows how in some configurations wires, such as wires 610 in wire bundle 600d, can have different shapes such as rectangular or trapezoidal to better accommodate interior features of a device housing.

Figure 7:
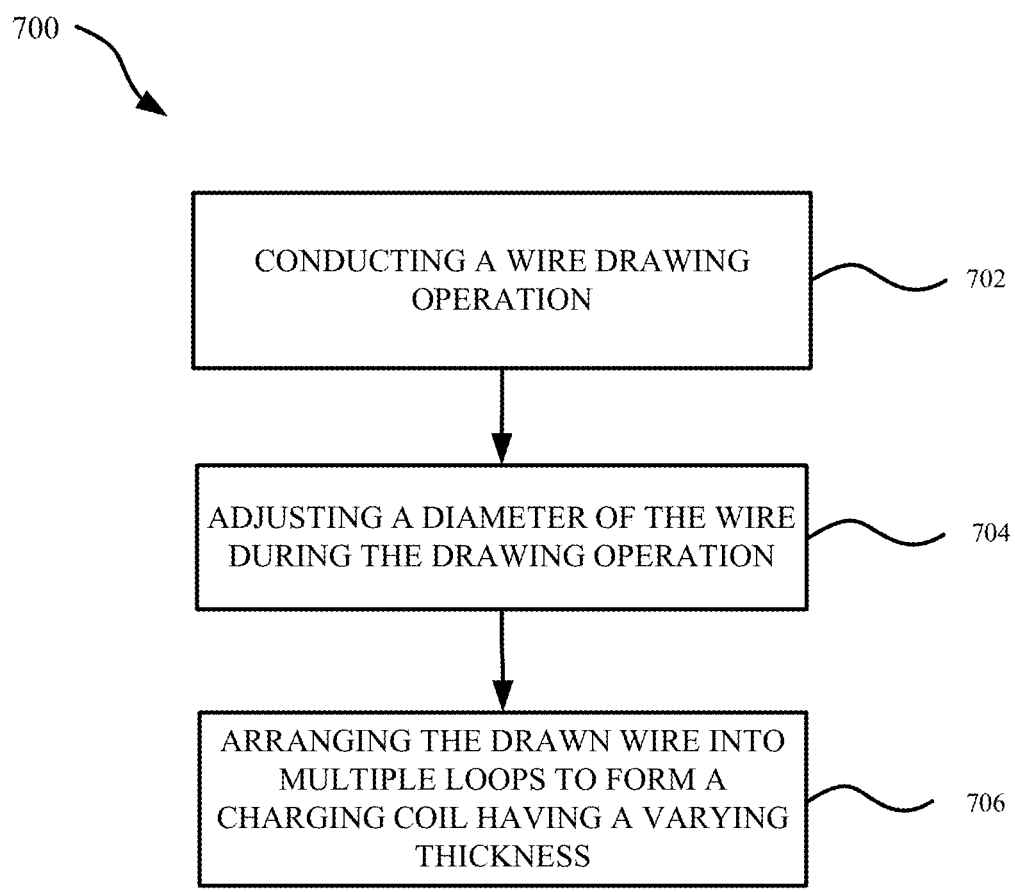
FIG. 7 shows a flow chart depicting a method of forming a variable diameter wire used in a charging coil.

FIG. 7 shows a flow chart depicting a method of forming a variable diameter wire used in a charging coil. At 702, a wire is formed using a wire drawing operation. This type of operation can be conducted by starting with a coil of hot rolled wire and then fed through a wire drawing machine. The wire is pulled through an aperture defined by a die that is smaller than the diameter of the wire, resulting in a lengthening and thinning of the wire stock. In some embodiments, multiple dies can be arranged in series having successively smaller apertures that eventually achieve a desired diameter of the wire. Alternatively, portions of the wire can selectively plated with electrically conductive materials to increase particular portions of the wire. In certain cases, a diameter of the wires can be reduced by chemically etching portions of the wire away. In some embodiments, these additive and subtractive processes can be used to adjust the charging coil to conform to various asymmetric device housing features proximate the charging coil At 704, different diameters can be applied to various different portions of the wire. The size of one or more of the dies can be adjusted to vary the diameter of the wire during the drawing operation. Alternatively, only a portion of the wire can be drawn through a particular die so that the portion drawn through the die can be substantially smaller than the portion not drawn through the die. At 706, the drawn wire or wires can be arranged into multiple loops so that a portion of the wires with larger diameters are arranged in areas of a device housing with larger amounts of space and portions of the wires with smaller diameters are arranged in areas of the device housing with less space.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A wireless charging coil, comprising:
   an electrically conductive conduit, comprising:
      first and second loops spaced apart from each other, the first loop formed from a first wire portion having a first wire diameter and the second loop formed from a second wire portion having a second wire diameter greater than the first wire diameter, the first and second loops being configured to receive power by induction.

2. The wireless charging coil of claim 1, wherein each of the first and second wire portions are wire bundles.

3. The wireless charging coil of claim 1, wherein a thickness of the wireless charging coil is greater in a central portion of the wireless charging coil than in a peripheral portion of the wireless charging coil.

4. The wireless charging coil of claim 1, wherein the first wire portion comprises a first plurality of wires and the second wire portion comprises a second plurality of wires and the first plurality of wires has the same number of wires as the second plurality of wires.

5. The wireless charging coil of claim 1, wherein the second loop includes a greater number of wires than the first loop.

6. The wireless charging coil of claim 1, wherein the first wire diameter is an outer diameter of a bundle of wires.

7. A portable electronic device, comprising:
   a device housing comprising a wall defining a concave recess within the device housing; and
   a charging coil, comprising an electrically conductive conduit arranged in a plurality of loops, an average outer diameter of a first portion of the electrically conductive conduit arranged in a central portion of the concave recess being greater than an average outer diameter of a second portion of the electrically conductive conduit that is arranged in a peripheral portion of the concave recess.

8. The portable electronic device of claim 7, wherein the average outer diameter of the electrically conductive conduit varies in a way that causes the first portion of the electrically conductive conduit to extend substantially the same distance from the concave recess as the second portion of the conduit.

9. The portable electronic device of claim 7, wherein the electrically conductive conduit comprises a plurality of wires twisted together.

10. The portable electronic device of claim 9, wherein a greater number of wires are twisted together in the first portion of the electrically conductive conduit than in the second portion of the electrically conductive conduit.

11. The portable electronic device of claim 7, wherein at least a portion of the wall defining the concave recess is formed from a magnetically permeable material.

12. The portable electronic device of claim 7, wherein the electrically conductive conduit comprises a first segment having an increasing diameter and a second segment having a decreasing diameter.

13. The portable electronic device of claim 7, wherein the electrically conductive conduit comprises a first segment and a second segment, the first segment having a greater number of wires than the second segment.

14. The portable electronic device of claim 7, wherein the charging coil has a substantially circular geometry.

15. A charging coil, comprising:
an electrically conductive conduit, comprising:
a first wire having a first length, and
a second wire having a second length less than the first length, the second wire being coupled with a portion of the first wire disposed in a central portion of the charging coil, wherein the electrically conductive conduit is arranged in a plurality of loops such that an average outer diameter of a first segment of the electrically conductive conduit is different than an average outer diameter of a second segment of the electrically conductive conduit, the first and second wires being configured to receive power by induction.

16. The charging coil of claim 15, wherein the second segment of the electrically conductive conduit is position at a peripheral portion of the charging coil and has a substantially smaller average outer diameter than the central portion of the charging coil.

17. The charging coil of claim 15, wherein the average outer diameter of the first segment is greater than the average outer diameter of the second segment.

18. The charging coil of claim 17, wherein the second segment of the first wire is disposed within the central portion of the charging coil.

19. The charging coil of claim 15, wherein the first and second wires are formed from a copper alloy.

* * * * *